No. 723,961. PATENTED MAR. 31, 1903.
E. O. WHITTLESEY.
LADY'S BELT, COLLAR, OR THE LIKE.
APPLICATION FILED OCT. 1, 1902.

NO MODEL.

Witnesses,
W. F. Palmer.
Emily F. Otis

Inventor,
Edith O. Whittlesey.
by Lothrop & Johnson
her Attorneys.

UNITED STATES PATENT OFFICE.

EDITH O. WHITTLESEY, OF ST. PAUL, MINNESOTA, ASSIGNOR OF ONE-HALF TO NELSON W. CLARK, OF MINNEAPOLIS, MINNESOTA, AND ARTHUR P. LOTHROP AND H. S. JOHNSON, OF ST. PAUL, MINNESOTA.

LADY'S BELT, COLLAR, OR THE LIKE.

SPECIFICATION forming part of Letters Patent No. 723,961, dated March 31, 1903.

Application filed October 1, 1902. Serial No. 125,568. (No model.)

*To all whom it may concern:*

Be it known that I, EDITH O. WHITTLESEY, a citizen of the United States, residing at St. Paul, in the county of Ramsey and State of Minnesota, have invented certain new and useful Improvements in Ladies' Belts, Collars, or the Like, of which the following is a specification.

My invention relates to improvements in ladies' belts, collars, and the like; and it consists, generally speaking, in a row of rings through which are threaded ribbons which hold the rings flexibly together.

Figure 1:
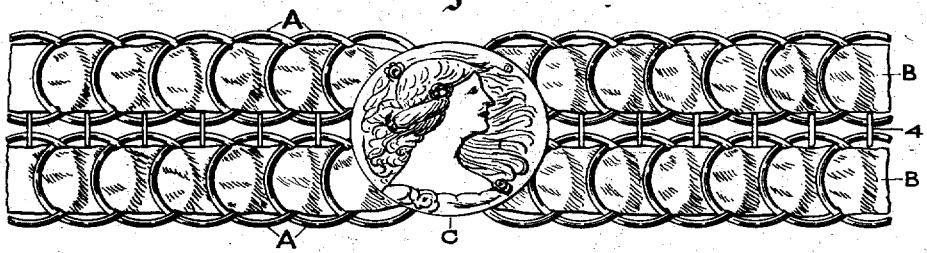
Figure 2:
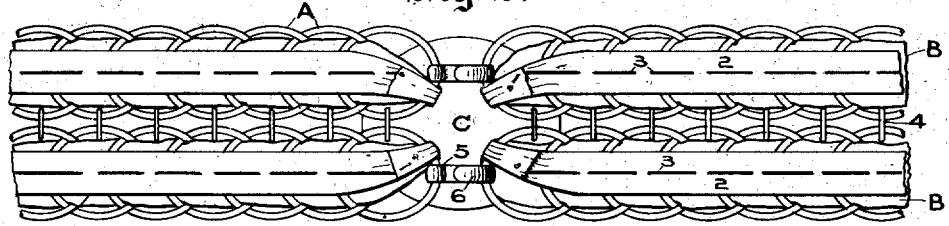
Figure 3:
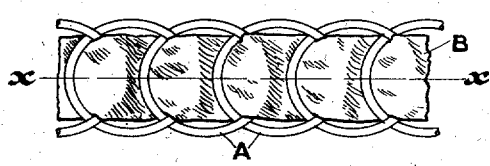
Figure 4:
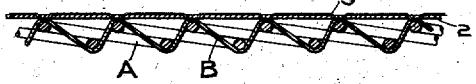

In the accompanying drawings, forming part of this specification, Figure 1 is a front view of part of a belt embodying my invention made of two rows of rings with interlaced ribbons and with links flexibly connecting the two rows. Fig. 2 is a rear view of the same. Fig. 3 is a detail of a belt made of a single row of rings connected by an interlaced ribbon, and Fig. 4 is a section on line x x of Fig. 3.

In the drawings, A A represent rings of metal or other suitable material. The rings are placed in a row in overlapping position, as shown in the drawings, and the ribbon B is threaded through them. It will be seen that the ribbon passes over one side of each ring, through the opening thereof, and under the overlapping portion of the next preceding ring in the row, thence being bent or turned upon itself to pass up over the overlapping portion of the next succeeding ring and under the other side of the original ring first mentioned. As thus interlaced the ribbon forms a flexible connection between the rings and holds them from separation, at the same time giving the belt a fluffy appearance. To relieve the tension upon the ribbon when the belt is drawn tightly around the body and to prevent the rings from drawing apart, so as to lengthen the belt and reduce the fluff in the ribbon, a strip 2 of flexible material is preferably secured by stitching 3 to the under side of the ribbon. The ends of the strip 2 are preferably secured to the end rings of the belt, as shown in Fig. 2 of the drawings.

I prefer to make the belt of two rows of rings, as shown in Fig. 1, loosely connected by links 4, made, preferably, of metal. These links form a flexible connection between the two rows of rings and allow the belt to conform to the curvature of the body and also allow each row to be capable of a considerable longitudinal movement with reference to the other row, so that the belt will always assume an easy and graceful position. The ends of the belt may be connected by any suitable means, such as the buckle C, (shown in the drawings,) which is secured by clasps 5 to the rings at one end of the belt and is formed with hooks 6 for detachable engagement with the rings at the other end of the belt.

In some cases it may be desired to use a single row of rings for a fob or narrow belt, as shown in Fig. 3. In this construction the rings are connected together in the same manner as in the preferred construction illustrated in Figs. 1 and 2.

Having now described my invention, what I claim as new, and desire to secure by Letters Patent, is—

1. An article of the class described, comprising a row of rings arranged in lapping position and an interlaced ribbon, the ribbon passing through the rings in one direction only and passing alternately under the underlapping and over the overlapping portions thereof, whereby the rings are held in lapped position.

2. In an article of the class described, the combination of a row of overlapping rings and a ribbon passing over one side of each ring through the opening thereof and over the underlapping portion of an adjacent ring, thence being bent upon itself to pass under the overlapping portion of a second ring, substantially as described.

3. An article of the class described, comprising a row of rings arranged in an overlapping position, a ribbon interlaced through said rings, and a strip secured along the rear side of the ribbon, for the purpose set forth.

4. An article of the class described, comprising two rows of rings, the rings of each row being arranged in overlapping position, a flexible connection between said rows of rings, and a ribbon interlaced through the rings of each row, substantially as described.

5. An article of the class described, comprising two rows of rings, the rings of each row being arranged in overlapping position, a ribbon interlaced through the rings of each row, each ring of one row being loosely connected with the corresponding ring in the other row, so that each row may have freedom of movement with respect to the other row.

6. An article of the class described, comprising two rows of rings, the rings of each row being arranged in overlapping position, links loosely connecting the rings of one row with the rings of the other row, a ribbon interlaced through the rings of each row, as described, and a strip secured along the rear side of the ribbon.

In testimony whereof I affix my signature in presence of two witnesses.

EDITH O. WHITTLESEY.

Witnesses:
E. J. WHITTLESEY,
C. W. MOORE.

---

Correction in Letters Patent No. 723,961.

It is hereby certified that in Letters Patent No. 723,961, granted March 31, 1903, upon the application of Edith O. Whittlesey, of St. Paul, Minnesota, for an improvement in "Ladies' Belts, Collars or the like," an error appears in the printed specification requiring correction, as follows: In line 31, page 1, the word "overlapping" should read *underlapping*; and that the said Letters Patent should be read with this correction therein that the same may conform to the record of the case in the Patent Office.

Signed and sealed this 23d day of June, A. D., 1903.

[SEAL.]

F. I. ALLEN,
*Commissioner of Patents.* row being arranged in overlapping position, a flexible connection between said rows of rings, and a ribbon interlaced through the rings of each row, substantially as described.

5. An article of the class described, comprising two rows of rings, the rings of each row being arranged in overlapping position, a ribbon interlaced through the rings of each row, each ring of one row being loosely connected with the corresponding ring in the other row, so that each row may have freedom of movement with respect to the other row.

6. An article of the class described, comprising two rows of rings, the rings of each row being arranged in overlapping position, links loosely connecting the rings of one row with the rings of the other row, a ribbon interlaced through the rings of each row, as described, and a strip secured along the rear side of the ribbon.

In testimony whereof I affix my signature in presence of two witnesses.

EDITH O. WHITTLESEY.

Witnesses:
E. J. WHITTLESEY,
C. W. MOORE.

---

Correction in Letters Patent No. 723,961.

It is hereby certified that in Letters Patent No. 723,961, granted March 31, 1903, upon the application of Edith O. Whittlesey, of St. Paul, Minnesota, for an improvement in "Ladies' Belts, Collars or the like," an error appears in the printed specification requiring correction, as follows: In line 31, page 1, the word "overlapping" should read *underlapping*; and that the said Letters Patent should be read with this correction therein that the same may conform to the record of the case in the Patent Office.

Signed and sealed this 23d day of June, A. D., 1903.

[SEAL.]

F. I. ALLEN,
*Commissioner of Patents.*

Correction in Letters Patent No. 723,961.

It is hereby certified that in Letters Patent No. 723,961, granted March 31, 1903, upon the application of Edith O. Whittlesey, of St. Paul, Minnesota, for an improvement in "Ladies' Belts, Collars or the like," an error appears in the printed specification requiring correction, as follows: In line 31, page 1, the word "overlapping" should read *underlapping*; and that the said Letters Patent should be read with this correction therein that the same may conform to the record of the case in the Patent Office.

Signed and sealed this 23d day of June, A. D., 1903.

[SEAL.]

F. I. ALLEN,
*Commissioner of Patents.*